United States Patent [19]
Finch

[11] 3,909,969
[45] Oct. 7, 1975

[54] DEVICE FOR TYING ARTIFICIAL FLIES
[76] Inventor: James L. Finch, 2015 Devereux Dr., Burlingame, Calif. 94010
[22] Filed: Jan. 10, 1975
[21] Appl. No.: 539,980

[52] U.S. Cl. .............................. 43/1; 43/25; 289/17
[51] Int. Cl.² ......................................... A01K 87/00
[58] Field of Search .......... 43/25, 25.2, 1, 4, 42.35, 43/23, 18; 289/17

[56] References Cited
UNITED STATES PATENTS

| | | | |
|---|---|---|---|
| 2,166,585 | 7/1939 | Evans | 43/1 |
| 2,236,781 | 4/1941 | Pannier | 43/1 |
| 2,843,961 | 7/1958 | Semple | 43/1 |
| 3,782,764 | 1/1974 | Browning | 289/17 |

*Primary Examiner*—Warner H. Camp
*Attorney, Agent, or Firm*—Flehr, Hohbach, Test, Albritton & Herbert

[57] ABSTRACT

A portable device for use by an angler in tying artificial flys. The device includes a collar having a central opening which is shaped to lockably engage with a shoulder formed on an end of the handle of a fishing rod. A support post is mounted to and extends radially outwardly from the collar at an angle from a casting reel which is mounted on the rod. The distal end of the post is threaded for mounting a clamp which is provided for gripping a fish hook upon which the fly is to be tied. In another embodiment the collar is comprised of a pair of half collars which are secured together about an end of the handle by means of lock rings.

10 Claims, 5 Drawing Figures

DEVICE FOR TYING ARTIFICIAL FLIES

BACKGROUND OF THE INVENTION

This invention relates to fishing equipment, and in particular relates to a portable fly tying device.

A number of different devices have heretofore been provided for use by a fisherman for tying artificial lures or flies. Certain of these devices employ clamps or vices which are mounted stationary, such as on a work bench or tackle box. However, these prior art devices have a number of limitations and shortcomings. The stationary clamps and vices are relatively cumbersome and are not adapted to be readily used in the field by a fisherman. Oftentimes it is desirable to have a fly tied while at the fishing site so that the correct type of fly can be used for the particular fishing conditions which are encountered. It is infeasible to use a stationary-type fly tying vice or clamp under such conditions. Thus there is a requirement for a fly tying device which can be easily carried and used in the field by a fisherman.

OJBECTS AND SUMMARY OF THE INVENTION

It is a general object of the invention to provide a new and improved device for use in tying artificial lures or flies onto a fish hook.

Another object is to provide a fly tying device which is relatively light and portable and which can be easily used on a fishing rod for tying flies while in the field.

Another object is to provide a fly tying device of the type described which can be easily carried while disassembled by a fisherman and then rapidly assembled onto a fishing rod while in the field.

Another object is to provide a fly tying device of the type described of which component elements can be made a part of an original manufactured fishing rod, or of which the elements can be retrofit onto existing fishing rods.

The invention provides a portable fly tying device which can be used in the field for rapidly tying an artificial fly onto a fish hook. A mounting collar is fitted on a fishing rod and is secured about one end of the handle of the rod. A support post is mounted on the collar and extends radially outwardly therefrom at a predetermined angle with respect to a casting reel which is also mounted on the rod. The distal end of the post is formed with threads upon which a hook clamping device, such as a pair of pliers, is mounted so as to hold a hook in a convenient position to permit the angler to easily tie the fly in the field. In one embodiment the mounting collar is fixedly secured to the handle, while in another embodiment the collar is split into half collars which are assembled onto an existing rod.

The foregoing and additional objects and features of the invention will appear from the following description in which the preferred embodiments have been set forth in detail in conjunction with the accompanying drawings.

DESCRIPTION OF THE PREFERRED EMBODIMENTS

Figure 1:
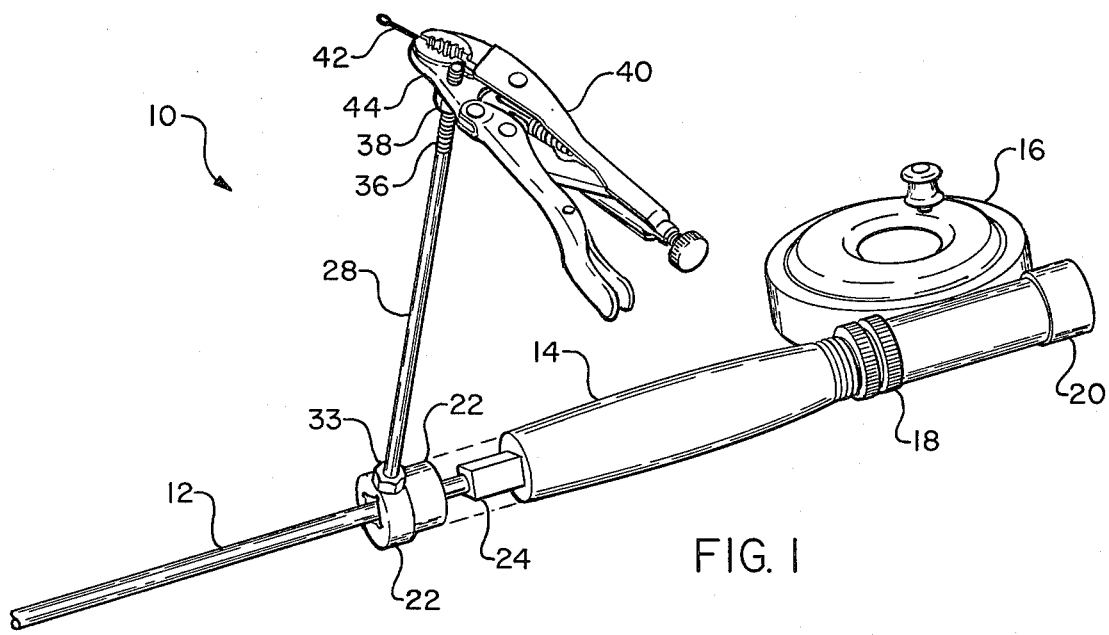
FIG. 1 is a perspective, partially exploded view illustrating one embodiment of a fly tying device made in accordance with the invention.
Figure 2:
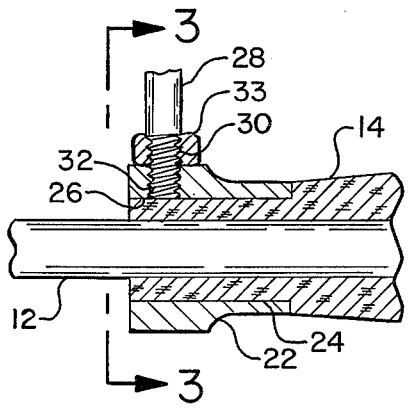
FIG. 2 is a fragmentary axial section view of the device of FIG. 1.

FIG. 1 illustrates generally at 10 a portable fly tying device constructed in accordance with one embodiment of the invention. Device 10 is adapted to be carried disassembled by an angler for rapid assembly in the field onto a fly rod 12. Fly rod 12 comprises an elongate flexible rod having at its base a handle 14 formed of a suitable material such as cork. A conventional fly casting reel 16 is mounted to the stub end of the rod by means of a threaded lock ring 18 and a slip ring 20.

Device 10 includes an annular mounting collar 22 which is secured about the rod in abutting relationship with the fore end of the handle. The fore end of the handle is formed with a polygonal locking shoulder 24, illustrated as having a preferred square configuration, which cooperates in locking engagement with a similarly configured square opening 26 formed axially through the collar. A coating of suitable adhesive or bonding cement is applied during assembly at the interface between shoulder 24 and collar opening 26 so as to fixedly secure the two elements together against axial displacement. At the same time the square configuration of the locking shoulder precludes rotation of the collar about the rod.

Figure 3:
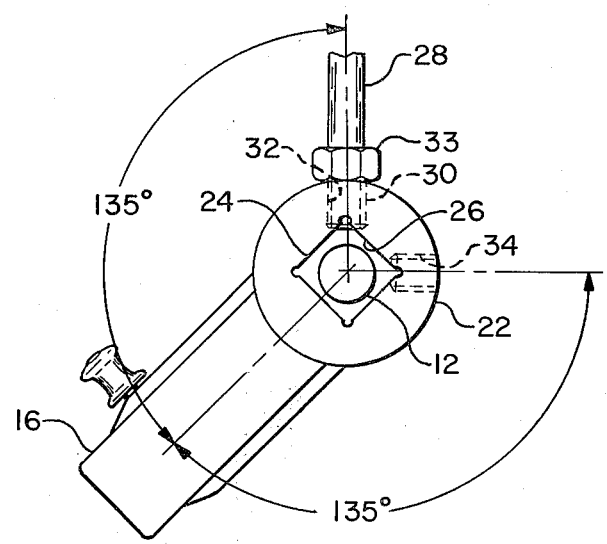
FIG. 3 is a cross-sectional view taken along the line 3—3 of FIG. 2.

Device 10 further includes a support post 28 which is secured at its threaded proximal end 30 with a threaded opening 32 formed in a side of collar 22. A tightening nut 33 is mounted on end 30 for locking the post to the collar. Opening 32 is formed at a predetermined radial position about the collar with respect to reel 16 so that the mounted support post extends radially outwardly at an included angle of at least 90° with respect to the reel, and preferably an included angle of 135°, as illustrated in FIG. 3. As will subsequently be described, this orientation of the support post with respect to the reel facilitates the use of fly tying device 10 such that both of the angler's hands are free for tying an artificial fly in the field.

An additional threaded opening 34 is formed through a side of collar 22 along a radius which forms an included angle of greater than 90°, and preferably 135°, with respect to the opposite side of reel 16, as illustrated in FIG. 3. The openings 32 and 34 are thus oriented 90° apart. Opening 34 is adapted for alternately mounting the proximal end of post 28 for use by the angler in an alternate fly tying orientation, in a manner to be described hereafter.

The distal end 36 of the post is formed with external threads which extend along a substantial distance, as illustrated in FIG. 1. One or more positioning and lock nuts 38 are mounted on the end 36. A suitable clamping device such as a small vice, or the illustrated pair of lock-grip pliers 40, is provided for clamping a fish hook 42. A threaded opening is formed in one jaw 44 of the pliers for engagement with distal end 36 of the post, and the pliers are adapted to be turned down on the threads of the post to the desired distance from the fly rod. The lock nuts 38 are then turned outwardly into engagement with jaw 44 for locking the pliers in the desired orientation.

In operation of the embodiment of FIG. 1 the pliers 40 are initially disassembled from post 28 and the post is disassembled from collar 22 so that the pliers and post can be easily carried by the angler in his pocket or tackle box. Where the angler desires to tie an artificial fly of the type he feels best suited to the particular fishing conditions which are encountered in the field, device 10 can be quickly assembled by screwing proximal end 30 of the post into one of the collar openings 32 or 34, depending upon whether the angler is right- or left-handed. For example, where the angler is right-handed he mounts the post into opening 32. He can then sit or kneel down with reel 16 clasped between the thigh and calf of his left leg and with rod 12 extending over his right knee in a direction toward his right. In this position post 28 projects upwardly in front of the angler. The threaded opening in pliers jaw 44 is then screwed onto post distal end 36 to the desired distance from the fly rod. Lock nuts 38 are then turned outwardly into engagement with the pliers, which are positioned so that the jaws thereof face the angler.

For tying the fly, the angler inserts the barbed end of fish hook 42 between the jaws of the pliers so that the eyelet end is facing toward him. The handles of the pliers are then closed and locked for securely gripping the hook. Both hands of the angler can now be freely used to tie the fly. To resume fishing the device is easily disassembled by unscrewing the pliers from the post and unscrewing the post from the collar 22.

For use by a left-handed angler the proximal end 30 of the post is mounted within collar opening 34. As the angler kneels or sits reel 16 is clasped between the thigh and calf of his right leg with rod 12 extending over the left knee in a direction toward his left. Post 28 thereby is oriented upwardly and the pliers are mounted on distal end 36 in a manner similar to that described for the right hand position.

Figure 4:
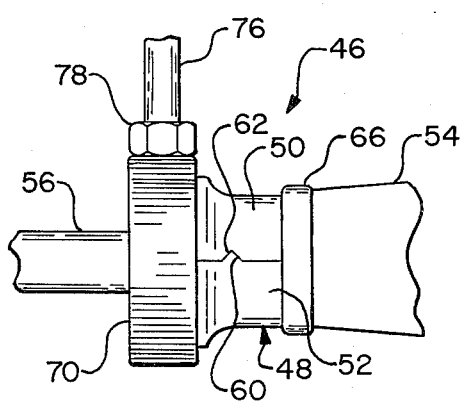
FIG. 4 is a fragmentary elevational view similar to FIG. 2 illustrating another embodiment of the invention.
Figure 5:
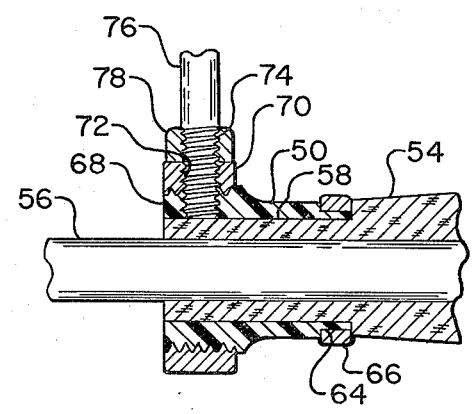
FIG. 5 is an axial section view of the embodiment of FIG. 4.

FIGS. 4 and 5 illustrate another embodiment of the invention providing a fly tying device 46 which is specially adapted to be retrofitted onto an existing fly rod. Device 46 includes a split collar 48 comprising a pair of semi-circular half collars 50, 52 which are mounted about the fore end of a cork handle 54 which in turn is mounted about the base end of the fly rod 56. A suitable fly casting reel, not shown, is mounted to the stud end of the rod in a manner similar to that described in connection with the embodiment of FIG. 1.

Where an existing fly rod is to be adapted for use with device 46, the fore end of cork handle 54 is shaped or cut down to form a polygonal shoulder 58, preferably of a square configuration. The two half collars 50 and 52 are each formed with internal, axially extending polygonal surfaces conforming to shoulder 58. A pair of radially extending notches 60 are formed in the opposed flat edge surfaces of half collar 50, and a complementary pair of radially extending ribs 62 are formed in the opposed flat edge surfaces of half collar 52. The ribs 62 are adapted to engage into the notches 60 with the two half collars assembled together to lock the same against axial displacement.

The ends 64 of the half collars which abut handle 54 are turned down to a reduced diameter, and a lock ring 66 is fitted over the reduced diameter for purposes of locking the half collars in assembled relationship. As desired, a suitable adhesive or cement may be applied at the interface between lock ring 66 and the half collars, or an internally threaded lock ring could be engaged with male threads formed about the reduced diameter ends of the half collars. The enlarged ends 68 of the half collars are formed with external threads and an internally threaded lock ring 70 is engaged about the ends 68 for additionally locking the collar onto handle 54.

An internally threaded radially extending opening 72 is formed through lock ring 70 and through the underlying portion of half collar 50 at an included angular orientation, preferably 135°, with respect to the casting reel, for use by a right-handed angler in a manner similar to that described for the embodiment of FIG. 1. An additional internally threaded opening, not shown, may be formed through lock ring 70 and the half collar at a 135° opposite included angular orientation from the reel for use by a left-handed angler in the manner previously described. The threaded proximal end 74 of a post 76 is engaged through opening 72 and a lock nut 78 is turned down into engagement with lock ring 70 to secure the post in place. The distal end of post 76 is threaded and is provided with a pair of lock nuts, not shown, for mounting a fish hook clamping device for tying a fly in a manner similar to that described for the embodiment of FIG. 1.

While the present embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A device for tying an artificial fly to a fish hook by means of a hook clamp and a fishing rod which includes at one end thereof an elongate handle, the device comprising the combination of a mounting collar formed with a central opening which is engaged about the rod, with one end of the collar abutting one end of the handle, a support post mounted at its proximal end to a side of said collar and extending radially outwardly therefrom, and means formed on the distal end of the post for fixedly holding said hook clamp in position for gripping a hook upon which a fly is to be tied.

2. A device as in claim 1 in which said one end of the handle is formed with a polygonal shaped shoulder, and said central opening in the collar is formed with a polygonal configuration which cooperates in locking engagement with said shoulder of the handle.

3. A device as in claim 2 in which the shoulder of the handle and the opening of the collar are each formed with a square configuration.

4. A device as in claim 1 which includes means forming a threaded, radially extending opening in the collar, and means forming external threads on the distal end of the post for engagement with the threaded opening of the collar.

5. A device as in claim 4 in which a pair of said threaded, radially extending openings are formed in the collar at substantially a 90° circumferential spacing for alternately mounting the threaded end of said post therein whereby a fly can be tied with the fishing rod oriented in alternate right or left hand positions with respect to the user.

6. A device as in claim 1 in which the collar comprises a pair of semi-circular half collars which interfit together to form a circular collar, and means for locking said half collars together about the shoulder of said handle.

7. A device as in claim 6 in which one of said half collars is formed with at least one radially extending notch and the other of said half collars is formed with at least one radially extending rib which is mounted in locking engagement with said notch for precluding relative axial displacement of the two half collars.

8. A device as in claim 6 in which the means for locking the half collars together includes a first annulus mounted about the ends of said half collars which abut the handle, together with a second annulus mounted about the ends of the half collar which are opposite said first mentioned ends.

9. For use in tying an artifical lure to a fish hook, the combination of a fishing rod having a handle at one end thereof, means forming a locking shoulder at one end of the handle, an annular collar mounted about the rod in engagement with the locking shoulder of the handle, a support post mounted at its proximal end to the collar and extending radially outwardly therefrom, clamp means for clamping a fishing hook, and means for mounting the clamp means to the distal end of the support post.

10. The invention of claim 9 which includes a fishing reel mounted on the rod adjacent said handle, means forming at least one radially extending threaded opening in said collar, means forming a threaded connection on the proximal end of the post for engagement with said threaded opening, said threaded opening being formed on the rod at an angle of greater than 90° with respect to a plane passing through said reel and the rod whereby when said reel is held by a user said post projects from the collar at an orientation which facilitates the tying of an artificial lure on a hook which is clamped by the clamp means.

* * * * *